(12) United States Patent
Davis et al.

(10) Patent No.: US 9,736,142 B2
(45) Date of Patent: *Aug. 15, 2017

(54) TOKENIZATION USING MULTIPLE REVERSIBLE TRANSFORMATIONS

(71) Applicant: Intel Corporation, Santa Clara, CA (US)

(72) Inventors: Mark H. Davis, Oakbrook Terrace, IL (US); Alexander S. Lukichev, Wheaton, IL (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/257,364

(22) Filed: Sep. 6, 2016

(65) Prior Publication Data

US 2016/0380998 A1 Dec. 29, 2016

Related U.S. Application Data

(63) Continuation of application No. 14/498,329, filed on Sep. 26, 2014, now Pat. No. 9,436,839.

(60) Provisional application No. 62/026,820, filed on Jul. 21, 2014.

(51) Int. Cl.
*H04L 29/06* (2006.01)
*G06F 21/62* (2013.01)
*G06F 21/60* (2013.01)
*G06F 21/78* (2013.01)

(52) U.S. Cl.
CPC ........ *H04L 63/0807* (2013.01); *G06F 21/602* (2013.01); *G06F 21/6209* (2013.01); *G06F 21/78* (2013.01); *H04L 63/061* (2013.01)

(58) Field of Classification Search
CPC ................................................. G06F 21/6209
USPC ........................................................ 713/194
See application file for complete search history.

(56) References Cited

U.S. PATENT DOCUMENTS 9,436,839 B2 * 9/2016 Davis .................. G06F 21/6209

* cited by examiner

*Primary Examiner* — Jacob Lipman
(74) *Attorney, Agent, or Firm* — Barnes & Thornburg LLP

(57) ABSTRACT

Technologies for tokenizing data including a computing device to extract plaintext data from an input file to be tokenized. The computing device performs data domain-specific format-preserving encryption on the extracted plaintext data based on a first cryptographic key to generate encrypted data and replaces one or more portions of the encrypted data with corresponding portions of alternative data based on a mapping table that maps encrypted data to alternative data. The computing device further performs data domain-specific format-preserving encryption on the alternative data based on a second cryptographic key to generate a token and stores the token in an output file.

25 Claims, 6 Drawing Sheets

TOKENIZATION USING MULTIPLE REVERSIBLE TRANSFORMATIONS

CROSS-REFERENCE TO RELATED U.S. PATENT APPLICATION

The present application is a continuation application of U.S. application Ser. No. 14/498,329, entitled "TOKENIZATION USING MULTIPLE REVERSIBLE TRANSFORMATIONS," which was filed on Sep. 26, 2014 and which claims priority under 35 U.S.C. §119(e) to U.S. Provisional Patent Application Ser. No. 62/026,820, entitled "TOKENIZATION USING MULTIPLE REVERSIBLE TRANSFORMATIONS," which was filed on Jul. 21, 2014.

BACKGROUND

Often, digital documents transmitted over networks or stored in various forms of computer storage contain data that should be protected from reading by an unauthorized reader. Further, due to the requirements of particular software architectures, various techniques protect the data without breaking the algorithms intended to work with the unmodified documents. A common approach is to replace the protected piece of data with a token—a string that resembles the original data but prevents the unauthorized reader access to the original text. Thus, tokenization solutions provide the means of encoding documents by replacing the protected data with tokens and subsequently reversing the process.

Most tokenization solutions utilize a secure vault or database to hold an encrypted copy of the original plaintext (i.e., clear-text) and the associated token for reverse mapping during the decoding phase of the tokenization solution. For example, the token may be a random value that must also conform to specific requirements, such as conforming to a sixteen digit credit card number including a checksum (e.g., a Luhn 10 checksum). In many solutions, the secure token database is a dynamic entity or structure that "grows" over time as new plaintext-token mappings are generated. It should be appreciated that solutions utilizing such a token vault have significant performance, data consistency, resource, and management challenges as the number of tokens increases within a cluster of machines and/or across clusters of geographically distributed data centers needed to meet high application availability, throughput, and latency requirements.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
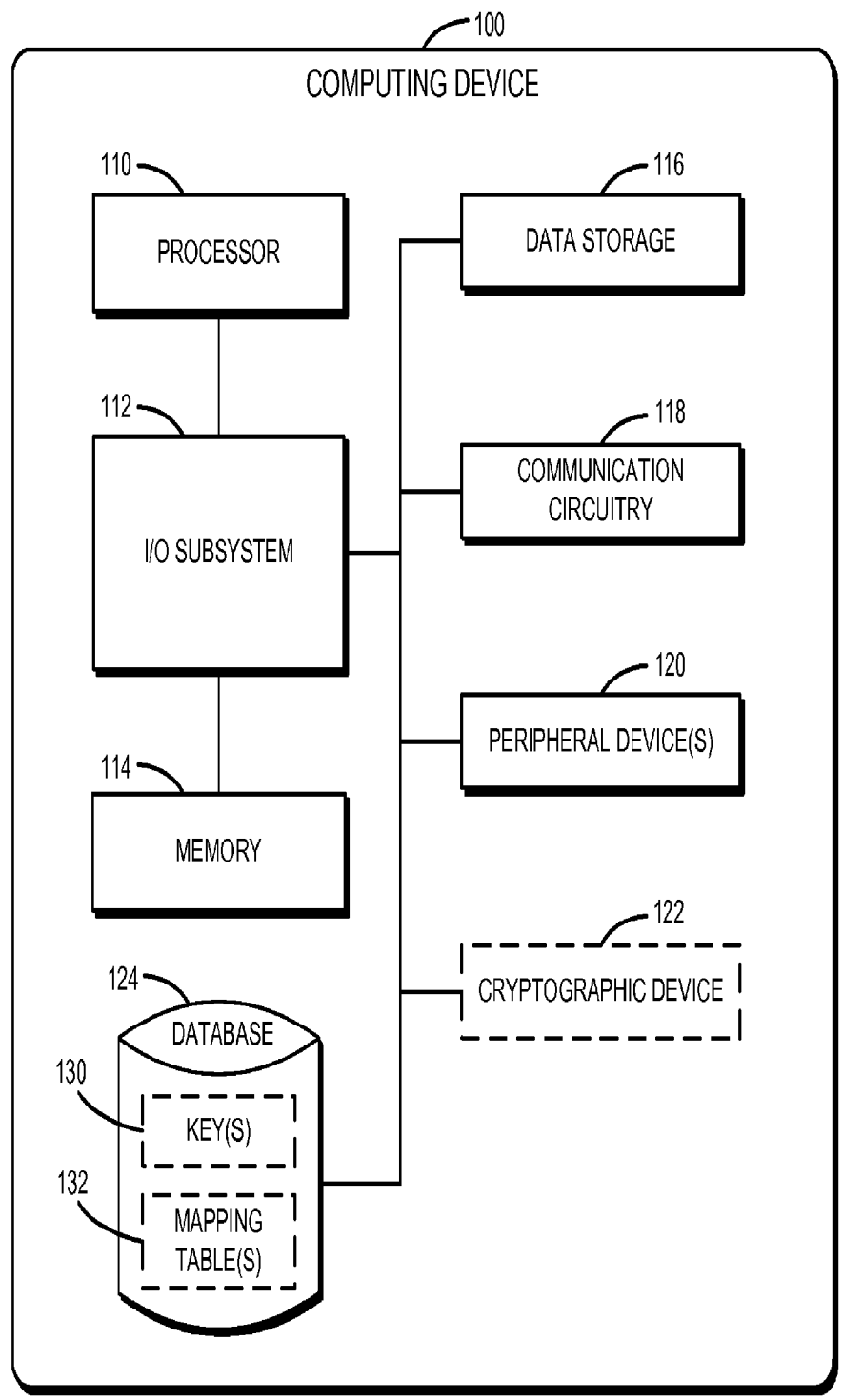
FIG. 1 is a simplified block diagram of at least one embodiment of a computing device for handling data tokenization.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a computing device 100 for data tokenization is shown. As described in detail below, the computing device 100 is configured to tokenize and detokenize data in a secure and efficient manner. It should be appreciated that, in some embodiments, the techniques described herein eliminate the need for a secure token database or vault by utilizing a reversible algorithm based on a combination of static mapping tables (e.g., pre-computed tables) and encryption/decryption. In the illustrative embodiment, the techniques described herein further support token generation for multiple data domain types with different semantic restrictions/constraints. In particular, as described herein, the computing device 100 may perform two reversible transformations based on data domain-specific format-preserving encryption (FPE) algorithms. It should be appreciated that an FPE cryptographic algorithm encrypts data in such a way that the encrypted output data (e.g., ciphertext) is maintained in the same format (e.g., same length and alphabet) as the input data (e.g., plaintext). For example, in an embodiment, an FPE-encrypted sixteen-digit credit card number is another sixteen-digit number. Additionally, although the unencrypted data is described primarily in reference to text data, in other embodiments, the techniques described herein may be applied to other types of data (e.g., images, audio data, etc.).

As described below, the computing device 100 applies an initial FPE-based transformation that ensures that the plaintext (e.g., clear-text) input to be tokenized is a pseudorandom value for which all positional dependence has been obfuscated. Subsequently, the computing device 100 applies an additional FPE-based transformation that ensures any potential look-up information "leakage" associated with the memory-intensive transformation is also obfuscated. It should be appreciated that the data domain-specific encryption may require additional processing to enforce the associated domain-specific constraint (e.g., ensuring that a generated social security number token area code subcomponent is within the valid range). The computing device 100 may utilize static mapping tables (e.g., pre-computed tables) containing random mappings to and from partial plaintext values and partial random token values. In the illustrative embodiment, the mapping is a reversible memory-intensive algorithmic function (e.g., in contrast to a strictly "mathematically-based" algorithm). In the illustrative embodiment, the computing device 100 utilizes such mapping tables between the two FPE-based transformations discussed above and based on the particular data domain-specific FPE algorithm By utilizing the FPE-based transformations, multiple small pre-computed static mapping tables may be utilized multiple times within the same tokenization without any potential information leakage. Additionally, in other embodiments, different symmetric keys and associated tweaks in the first and/or third stage FPE-based transformations may be utilized to uniquely multiplex the generated tokens to be unique for individual merchants, merchant groups, services, and/or other suitable entities.

The computing device 100 may be embodied as any type of computing device capable of performing the functions described herein. For example, the computing device 100 may be embodied as a desktop computer, server, router, switch, laptop computer, tablet computer, notebook, netbook, Ultrabook™, cellular phone, smartphone, wearable computing device, personal digital assistant, mobile Internet device, Hybrid device, and/or any other computing/communication device. As shown in FIG. 1, the illustrative computing device 100 includes a processor 110, an input/output ("I/O") subsystem 112, a memory 114, a data storage 116, a communication circuitry 118, and one or more peripheral devices 120. Additionally, in some embodiments, the computing device 100 may also include a cryptographic device 122 to facilitate cryptographic functions. Of course, the computing device 100 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the computing device 100 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the computing device 100. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the computing device 100, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the computing device 100 useful for performing the functions described herein. As shown in FIG. 1, the computing device 100 may also include a database 124. Depending on the particular embodiment, the database 124 may be stored in the data storage 116, stored in the memory 114, stored on a remote computing device, and/or embodied as a component of the computing device 100. As described below, in the illustrative embodiment, the database 124 includes one or more cryptographic keys 130 and one or more mapping tables 132. In the illustrative embodiment, the cryptographic keys 130 are embodied as cryptographic keys associated with an FPE-based encryption/decryption algorithm; however, in some embodiments, one or more of the cryptographic keys 130 may be based on another suitable cryptographic algorithm. For example, the cryptographic keys 130 may include symmetric cryptographic keys, asymmetric cryptographic keys, session keys, signature keys, cryptographic hashes, cryptographic tweaks (e.g., a cross between a hash salt and an initialization vector), cryptographic initialization vectors or values, cryptographic salt values or functions, and/or other data related to cryptographic functions. Further, in the illustrative embodiment, the mapping tables 132 are configured to map data to alternative data in a format-preserving manner as described below.

The communication circuitry 118 may be embodied as any communication circuit, device, or collection thereof, capable of enabling communications between the computing device 100 and other remote devices over a network. The communication circuitry 118 may be configured to use any one or more communication technologies (e.g., wireless or wired communications) and associated protocols (e.g., Ethernet, Bluetooth®, Wi-Fi®, WiMAX, etc.) to effect such communication.

The peripheral devices 120 may include any number of additional peripheral or interface devices, such as speakers, microphones, additional storage devices, and so forth. The particular devices included in the peripheral devices 120 may depend on, for example, the type and/or intended use of the computing device 100.

The cryptographic device 122 may be embodied as any hardware component(s) or circuitry capable of performing cryptographic functions and/or establishing a trusted execution environment. For example, in some embodiments, the cryptographic device 122 may be embodied as a security co-processor, such as a trusted platform module (TPM), a secure enclave such as Intel® Software Guard Extensions (SGX), or an out-of-band processor. Additionally, in some embodiments, the cryptographic device 122 may establish an out-of-band communication link with remote devices.

As described below, the illustrative computing device 100 is capable of performing tokenization without a secure token database. Accordingly, the resource, data consistency, and management issues associated with such a database may be also eliminated (e.g., data backup, data compaction, internal communication channels, etc.). The elimination of such additional issues allows for the ability to linearly scale within a cluster by adding nodes and to linearly scale across multiple clusters by replicating the first and third stage symmetric keys, cryptographic tweaks, and/or pre-computed static mapping tables. As such, in some embodiments, multiple hosts/clusters may each be configured to independently perform its own tokenization and/or detokenization operations on different or identical plaintext or tokens.

It should be appreciated that multiple mapping tables may be utilized such that each of the mapping tables cover a small portion of the potential data domain range of possible input values. For example, a medical application may tokenize a patient's name that could be up to 128 Latin alphabet characters and decimal digits. Building a single pre-computed mapping table would have $(10+26+26)^{128}=62^{128}$ entries, because there are 10 decimal numbers (0 through 9), 26 lowercase letters (a though z), and 26 uppercase letters (A through Z). It is not practical to build a single mapping table of that size. Therefore, one or more mapping tables covering a subset of that range may be utilized multiple times. However, if the same sub-pattern of clear-text appears in multiple inputs, then all of the generated tokens would have the same pre-computed mapping value for this identical sub-pattern.

By utilizing the first stage algorithm transformation (e.g., with an FPE-based algorithm), information from the entire unencrypted data (e.g., clear-text) input is distributed across all of the resulting encrypted data (e.g., encrypted text, ciphertext, or otherwise obfuscated text) in the illustrative embodiment. Further, by using the first stage encrypted data (e.g., encrypted text) as input to the second stage mapping table look-up, the look-up bias associated with hitting the same table entry is eliminated or significantly reduced. For example, the first six digits of a credit card number are the issuer identification number. As described below, the encrypted data is replaced with alternative data based on a mapping table during a second stage transformation. Further, based on a third stage transformation using FPE, even if there was any look-up entry bias, the multiple look-up results are, in some embodiments, distributed across the entire resulting token.

It should be appreciated that if a six digit (or smaller) pre-computed static mapping table is used for tokenization of credit card numbers, then all credit card numbers associated with the same bank (i.e., issuer) would have the same partial token value without having the first or third stage transformations as described herein. The mapping tables (e.g., pre-computed static mapping tables) provide a reversible memory-intensive algorithmic transformation. Although such techniques may be memory-intensive, they are generally not computability-intensive like AES, 3DES, Camellia, and Blowfish bulk ciphers. Further, in the illustrative embodiment, there is no single symmetric key that, if compromised, would comprise everything encrypted. Generally, an attacker knowing how one entry maps a single clear-text value to a token would not reveal anything about another entity mapping of the mapping table. Additionally, the techniques described herein are not vulnerable (or are otherwise less vulnerable) to the normal side-channel attacks to which standard encryption ciphers are known to be vulnerable (e.g., timing or cache hits) due to, for example, the same code pattern occurring on all look-ups with standard encryption ciphers.

It should be appreciated that an attacker must essentially compromise three entities or structures to launch a successful attack. That is, the attacker would have to compromise the first and third stage symmetric keys and associated cryptographic tweaks and also compromise the mapping tables. Further, in some embodiments, the symmetric key and tweak used in the first stage and/or the third stage transformation may be replaced with a merchant, merchant group, or back-end application-specific symmetric key and tweak to make the generated token value specific to that entity. It should be appreciated that the primary function of a cryptographic tweak is to serve a similar function that a salt does but for a reversible cipher (e.g., the FPE algorithms described herein). In particular, a cryptographic tweak generally maps the clear-text value to a different encrypted-text value when the same cryptographic symmetric key is used. In the illustrative embodiment, the cryptographic tweak is kept private and utilized to introduce further entropy into the reversible transformations and reduce potential information leakage.

Figure 2:
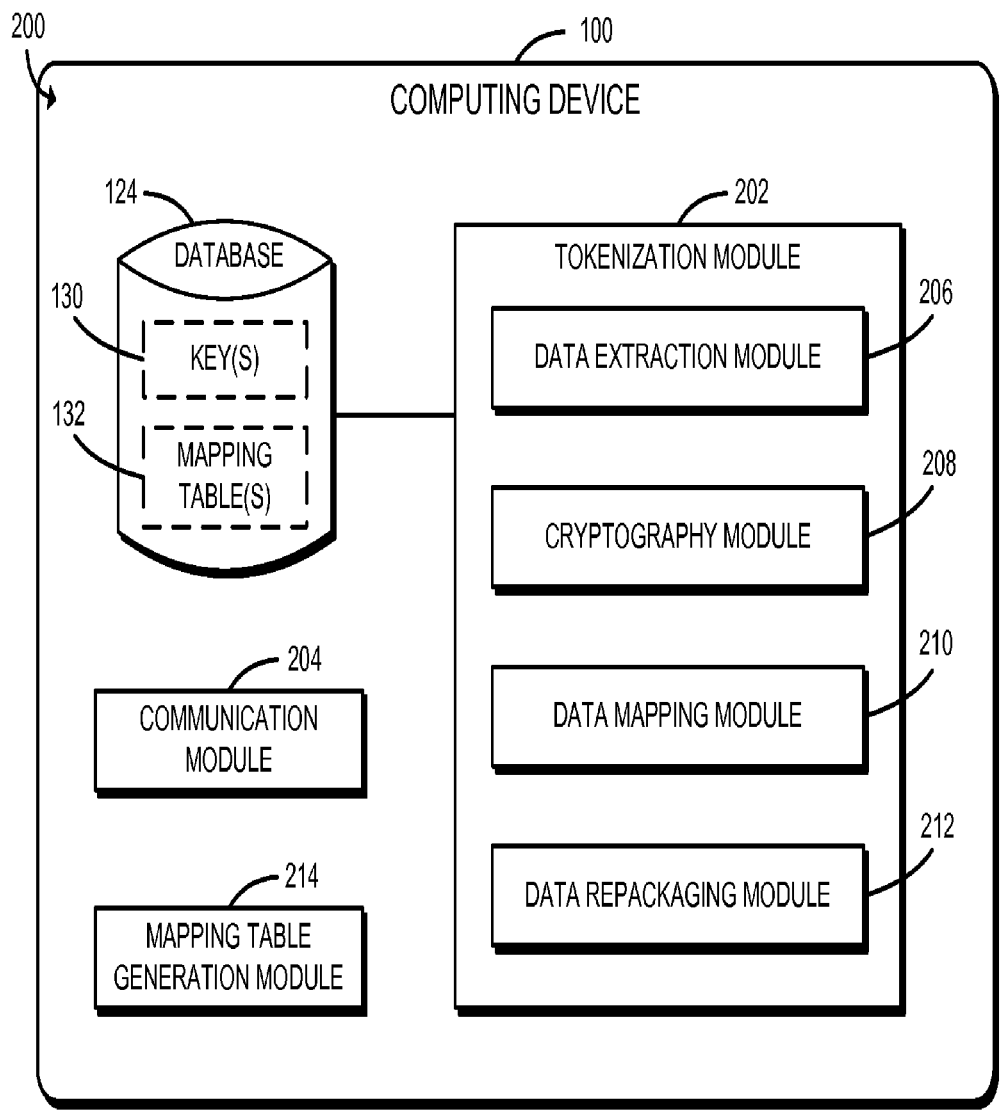
FIG. 2 is a simplified block diagram of at least one embodiment of an environment of the computing device of FIG. 1.

Referring now to FIG. 2, in use, the computing device 100 establishes an environment 200 for data tokenization. The illustrative environment 200 of the computing device 100 includes a tokenization module 202 and a communication module 204. Additionally, the tokenization module 202 further includes a data extraction module 206, a cryptography module 208, a data mapping module 210, and a data repackaging module 212. Further, in some embodiment, the environment 200 also includes a mapping table generation module 214. Each of the modules of the environment 200 may be embodied as hardware, software, firmware, or a combination thereof. Additionally, in some embodiments, one or more of the illustrative modules may form a portion of another module and/or one or more of the illustrative modules may be embodied as a standalone or independent module. For example, each of the modules, logic, and other components of the environment 200 may form a portion of, or otherwise be established by, the processor 110 of the computing device 100.

The tokenization module 202 is configured to handle the tokenization, detokenization, and related functions of the computing device 100. The data extraction module 206 is configured to identify and extract data from a file (e.g., a text file, database, and/or other file) to be tokenized. The data extraction module 206 is further configured to identify and extract data from the file to be detokenized. In some embodiments, the data may be extracted from a particular file, tokenized, and replaced in the file. Accordingly, in such embodiments, the data extraction module 206 may extract tokenized data from that file for detokenization and replacement. In some embodiments, the data extraction module 206 further identifies portions of the extracted data that should not tokenized or detokenized (e.g., the first or last few digits).

The cryptography module 208 is configured to perform various cryptographic functions as described herein. For example the cryptography module 208 may perform the FPE-based transformations associated with the first and third stage of the techniques described herein. In other words, the cryptography module 208 is configured to perform data domain-specific encryption and decryption of data. Of course, in some embodiments, the cryptography module 208 may also perform other cryptographic functions of the computing device 100. In some embodiments, the cryptography module 208 is embodied as, or otherwise included in, the cryptographic device 122.

The data mapping module 210 is configured to replace "chunks" of data with alternative data chunks based on the mapping tables 132 with respect to the second stage transformation described herein.

The data repackaging module 212 is configured to repackage the transformed data into a file. In the illustrative embodiment, the transformed data is repackaged into the same file from which it is extracted; however, in other embodiments, that may not be the case. For example, the transformed data may be repackaged into a part of another file (e.g., a database). In particular, the data repackaging module 212 is configured to repackage generated tokens into a file, for example, at the locations in the file from which the data was extracted. Further, during detokenization, the data repackaging module 212 is configured to repackage the generated plaintext (or otherwise decryption original data) in a file at an appropriate location (e.g., the location from which the data was originally extracted for tokenization). The communication module 204 handles the communication between the computing device 100 and remote computing devices through a network.

The mapping table generation module 214 is configured to generate one or more data domain-specific mapping tables 132 for use as described herein. It should be appreciated that the mapping tables 132 may be generated using any suitable algorithms, techniques, and/or mechanisms. For example, in the illustrative embodiment, a data domain-specific mapping table 132 may be generated by determining an alphabet associated with the data domain and using a one-time symmetric cryptographic key and cryptographic tweak to iterate through table entries to generate a unique table mapping. In some embodiments, the mapping table generation module 214 may iterate through all possible mapping table entries and determine/identify random entries with which to swap the mapping table entries. Further, in embodiments in which data domain-specific restrictions exist, the mapping table generation module 214 may iterate through the table entries and ensure that valid table entries (e.g., valid social security numbers) are mapped to other valid entries and that invalid table entries are mapped to other invalid entries.

As described below, in some embodiments, the computing device 100 may utilize, and therefore the mapping table generation module 214 may generate, mapping tables 132 having entries with data chunks having different sizes. For example, the mapping table generation module 214 may generate a mapping table 132 having mappings for 5-character data chunks, 4-character data chunks, 3-character data chunks, 2-character data chunks, and 1-character data chunks (or any other suitable combination of data chunk sizes). In some embodiments, the computing device 100 utilizes the largest possible data chunk available for the mapping possible based on the length of the encrypted data (e.g., encrypted plaintext) or decrypted data (e.g., decrypted token data) as described below (e.g., to ensure significant randomness). It should further be appreciated that, in some embodiments, the mapping table generation module 214 may generate multiple mapping tables 132 for a particular field or application, to enforce data domain restrictions, and/or for other suitable reasons. For example, in some embodiments, the mapping table generation module 214 may generate two different mapping tables 132 to handle the serial number and the area code/group sub-components of a social security number because of domain-specific restrictions. Of course, in some embodiments, the data domain-specific mapping tables 132 may be pre-computed by a remote computing device and received by the computing device 100 for subsequent use.

Figure 3:
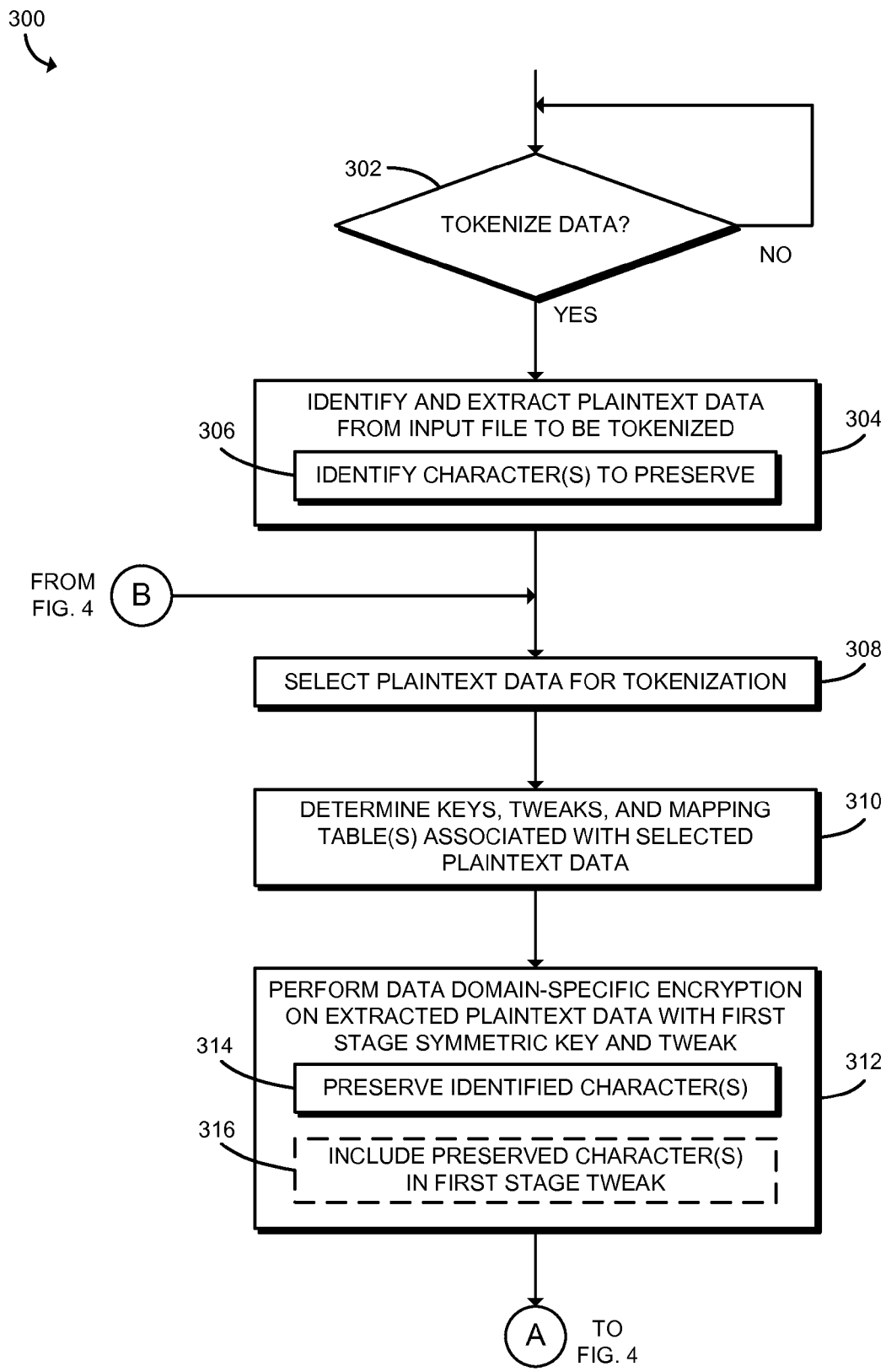
FIGS. 3-4 is a simplified flow diagram of at least one embodiment of a method for tokenizing data that may be executed by the computing device of FIG. 1.

Referring to FIG. 3, in use, the computing device 100 may execute a method 300 for tokenizing data. The illustrative method 300 begins with block 302 in which the computing device 100 determines whether to tokenize data. If so, in block 304, the computing device 100 identifies and extracts plaintext data from an input file to be tokenized. The computing device 100 may identify the data set for tokenization using any suitable techniques (e.g., specific fields in an input file, user input, etc.). In doing so, in block 306, the computing device 100 may identify one or more characters to preserve from tokenization. In other words, the computing device 100 may identify portion of the data (e.g., a certain number of characters) that are not to be included in the extracted data to be replaced during tokenization. As described below, in some embodiments, the preserved characters may be used in the generation on a unique token value (e.g., in conjunction with a cryptographic tweak). For example, the computing device 100 may preserver a certain number of characters of the plaintext data (e.g., the first six digits and the last four digits of a credit card number). In the illustrative embodiment, in determining the data to be tokenized, the computing device 100 also determines the particular alphabet(s) of the data to be tokenized. Although the data to be tokenized is described herein primarily as plaintext data, it should be appreciated that the techniques described herein may be applied to non-textual data in some embodiments. That is, the particular alphabet utilized may be the Latin alphabet, Cyrillic alphabet, Greek alphabet, Mandarin alphabet, decimal digits, alphanumeric characters, binary digits, characters with diacritical marks, or another suitable alphabet depending on the particular embodiment. As such, the tokenized data may include, for example, digital images and/or other data having a binary representation. Further, in some embodiments, the computing device 100 ensures that the identified data fields to be tokenized do not overlap with one another.

In block 308, the computing device 100 selects an identified plaintext data element (e.g., a data field, word, or otherwise identified portion of plaintext data). As discussed below, the computing device 100 iterates through the identified plaintext data to generate the corresponding tokenized data (i.e., tokens). As such, the computing device 100 may select the plaintext data for tokenized in any suitable order. In block 310, the computing device 100 determines the cryptographic keys (e.g., first and third stage symmetric keys), cryptographic tweaks (e.g., first and second stage cryptographic tweaks), and mapping table(s) associated with the selected plaintext data (e.g., based on the determined alphabet, any known data domain-specific restrictions, and/or other suitable information). As described herein, in some embodiments, if the length of the token being generated exceeds the largest chunk size supported, multiple table look-ups may be performed.

In block 312, the computing device 100 performs data domain-specific encryption on the extracted data with a first stage symmetric key and cryptographic tweak. For example, the computing device 100 may utilize data domain-specific FPE encryption with a pre-computed application first stage symmetric key and tweak. Performing such encryption redistributes the information contained within the extracted data across all characters of the extracted data in some embodiments. As discussed above, in some embodiments, the computing device 100 may identify one or more character(s) of the input data to preserve. As such, in block 314, the computing device 100 may preserve the identified character(s), for example, by storing those characters in the memory 114, the data storage 116, and/or the database 124. Further, in block 316, the computing device 100 may include the preserved character(s) in the first stage cryptographic tweak. For example, the computing device 100 may append the preserved character(s) to the first stage cryptographic tweak value (e.g., before, after, or in the middle of the tweak). It should be appreciated that doing so ensures that if the same character pattern is tokenized, but the preserved characters are different, then different token values will be generated. Additionally, as discussed above, in some embodiments, some specific data domain types (e.g., social security numbers and email addresses) may require separate processing on different sub-components of the data. In such embodiments, the computing device 100 may append the plaintext of the most varied sub-component (e.g., most random or unique) to the least varied sub-component. For example, the local portion of an email address may be appended to the tweak used for the domain sub-component. As such, the computing device 100 may ensure that if the same sub-component character pattern is tokenized that different token values will be generated and only the length of the sub-component, which does not change, may be leaked.

Figure 4:
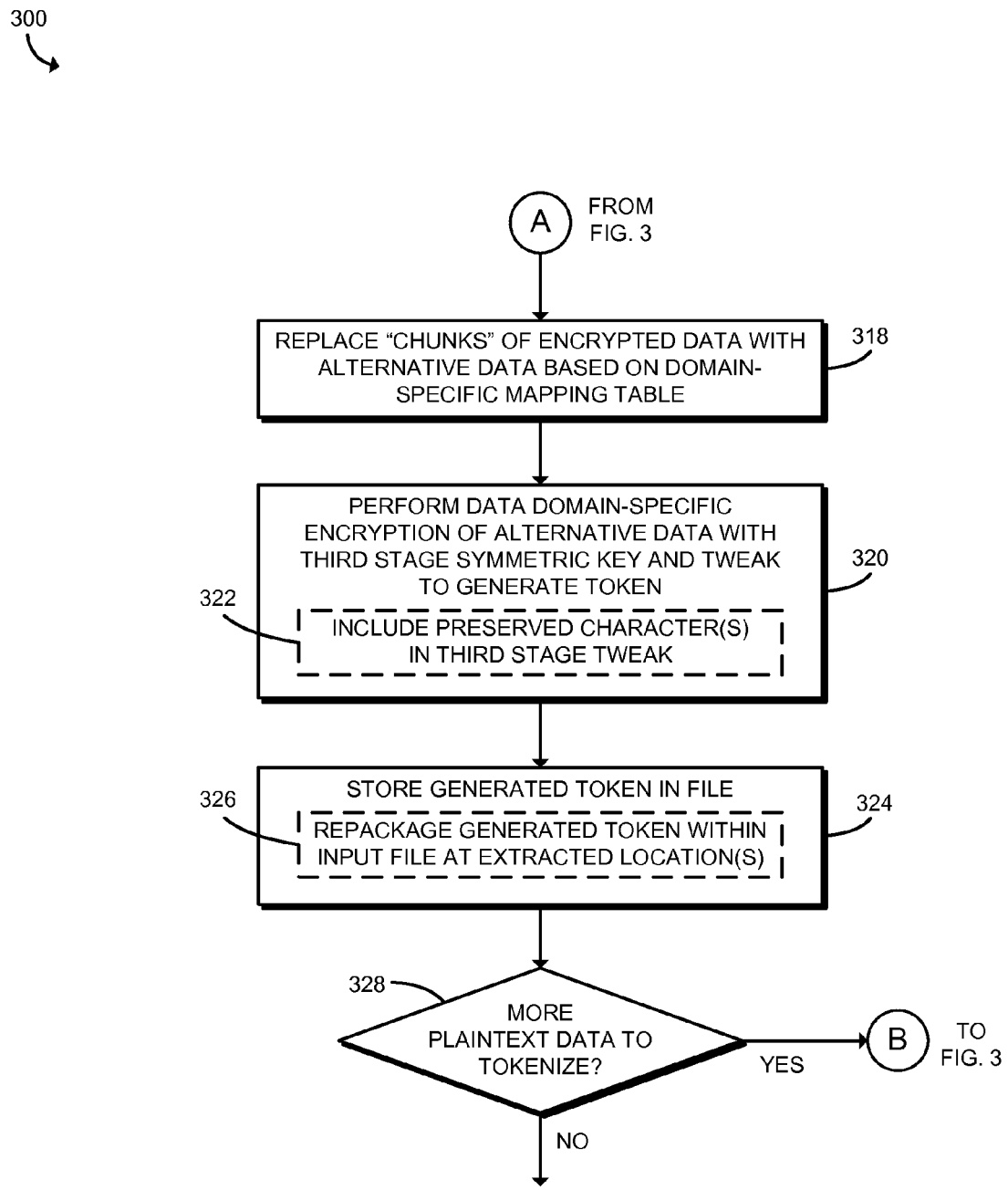

In block 318 of FIG. 4, the computing device 100 replaces "chunks" of encrypted data (i.e., from the first stage) with alternative data based on the mapping table(s). That is, the computing device 100 looks up each chunk or portion of the encrypted data from the first stage in the appropriate static mapping data and replaces it with the alternative data to which it is mapped. It should be appreciated that, in some embodiments, this is done by breaking out the largest chunk size supported by a pre-computed mapping table and performing that look-up. In the illustrative embodiment, if there is a partial chunk remaining, a smaller sized pre-computed mapping table is used to perform the look-up mapping for that partial chunk. As such, in the illustrative embodiment, mapping tables of different sizes may be used depending on the particular data extracted. Each chunk look-up may require mapping the physical characters to their associated radix string equivalence and then mapping that to their big-integer encoding in some embodiments.

In block 320, the computing device 100 performs data domain-specific encryption of the alternative data with the third stage symmetric key and cryptographic tweak to generate one or more tokens. For example, the computing device 100 may utilize data domain-specific FPE encryption with a third stage symmetric encryption key and cryptographic tweak. Further, in some embodiments, the computing device 100 may, in block 322, include one or more preserved characters in the third stage cryptographic tweak in a manner similar to that described above in block 316. In the illustrative embodiment, the FPE encryptions performed in the blocks 312 and 320 (i.e., the first and third stages) may enforce the data domain-specific restrictions and/or constraints. For example, if a valid social security number is being tokenized, then the area code, group, and serial number subcomponent restrictions are enforced in the illustrative embodiment.

In block 324, the computing device 100 stores the generated token in a file (e.g., in the memory 114 and/or the data storage 116). For example, in block 326, the computing device 100 may repackage the generated token within the input file (i.e., the input document or file) at the extracted location(s). In other embodiments, the computing device 100 may, alternatively or additionally, store the generated token in another location (e.g., another file). It should be appreciated that blocks 312, 318, and 320 may be referred to herein as the first stage transformation, the second stage transformation, and the third stage transformation, respectively, for convenience.

In block 328, the computing device 100 determines whether there is more plaintext data to tokenize. If so, the method 300 returns to block 308 of FIG. 3 in which the computing device 100 selects the next plaintext data for tokenization. As described above, the computing device 100 may determine which plaintext data to select next in any suitable order depending on the particular embodiment.

By way of example, suppose the computing device 100 has identified a 16-digit credit card number for tokenization and does so with the option to preserve the last five decimal digits of the credit card number. In some embodiments, the computing device 100 may utilize, for example, mapping tables handling four decimal digit chunks (i.e., having 10,000 entries in the mapping tables). It should be appreciated that, in the illustrative embodiment, there is no association between the table entry and the entry value. Further, a table value only appears once within the table and there is a one-to-one correspondence between the table index and the table content.

Continuing the example, the computing device 100 takes the incoming 16-digit credit card number (e.g., 1234567890123456) and extracts the data to be tokenized (e.g., 12345678901). Additionally, the computing device 100 stores the last five characters (e.g., 23456) and their positions in the incoming plaintext, because that information is preserved as discussed above. In the illustrative embodiment, the validity of the token Luhn checksum is not enforced due to the application configured options (e.g., preservation of the last five digits). During the first stage transformation, the computing device 100 performs FPE-based encryption on the extracted data to generate encrypted data: $ENC_{FPE}(key_{stage1},(tweak_{stage1}[I\ preserved]),alphabet_{decimal1},"12345678901")=61666621038$. It should be appreciated that, in some embodiments, the computing device 100 may enforce Luhn check digit validity by placing a restriction on the tokenized portion of the input data. For example, the computing device 100 may utilize a cycle walking algorithm within the first stage transformation and the third stage transformation and utilize table walking within the second stage transformation. Depending on the specific semantics being enforced in a particular embodiment, other mechanisms may be utilized to enforce the data domain-specific restrictions. For example, if the last digit of a credit card number is not being preserved, the digits may be tokenized and/or Luhn check digit may be generated.

During the second stage transformation, the computing device 100 performs three mapping table look-up replacements. In the illustrative embodiment, because the tokenized data is 11-digits in length, 4-digit and 3-digit pre-computed mapping table chunks are utilized. That is, the computing device 100 maps the first four digits to alternative data, the second four digits to alternative data, and the last three digits to alternative data mapped to those chunks in the illustrative embodiment. For example, the computing device 100 may replace the chunk "6166" with that table entry unique table value (i.e., mapped value) of "9584," may replace the chunk "6621" with the mapped value of "6004," and may replace the chunk "038" with the value "283." After the mapping, the alternative (i.e., mapped) data/value is "95846004283." The last mapping table look-up is performed using a 3-digit pre-computed mapping table in the illustrative embodiment. It should be appreciated that using the largest size of the multiple size pre-computed static mapping tables maximizes (or otherwise improves) the randomness encoded into the token.

During the third stage transformation, the computing device 100 performs FPE-based encryption on the extracted data or, more particularly, the alternative data to generate the token: $ENC_{FPE}(key_{stage3},(tweak_{stage3}[I\ preserved]),alphabet_{decimal},"95846004283")=67459114741$. The computing device 100 may merge the generated token with the original preserved input (e.g., "23456") if any to generate a merged token (e.g., "6745911474123456"). That is, the generated token is merged with the characters preserved from the original input. As discussed above, the computing device 100 may further repackage the token (or merged token) in the file at the appropriate location.

Figure 5:
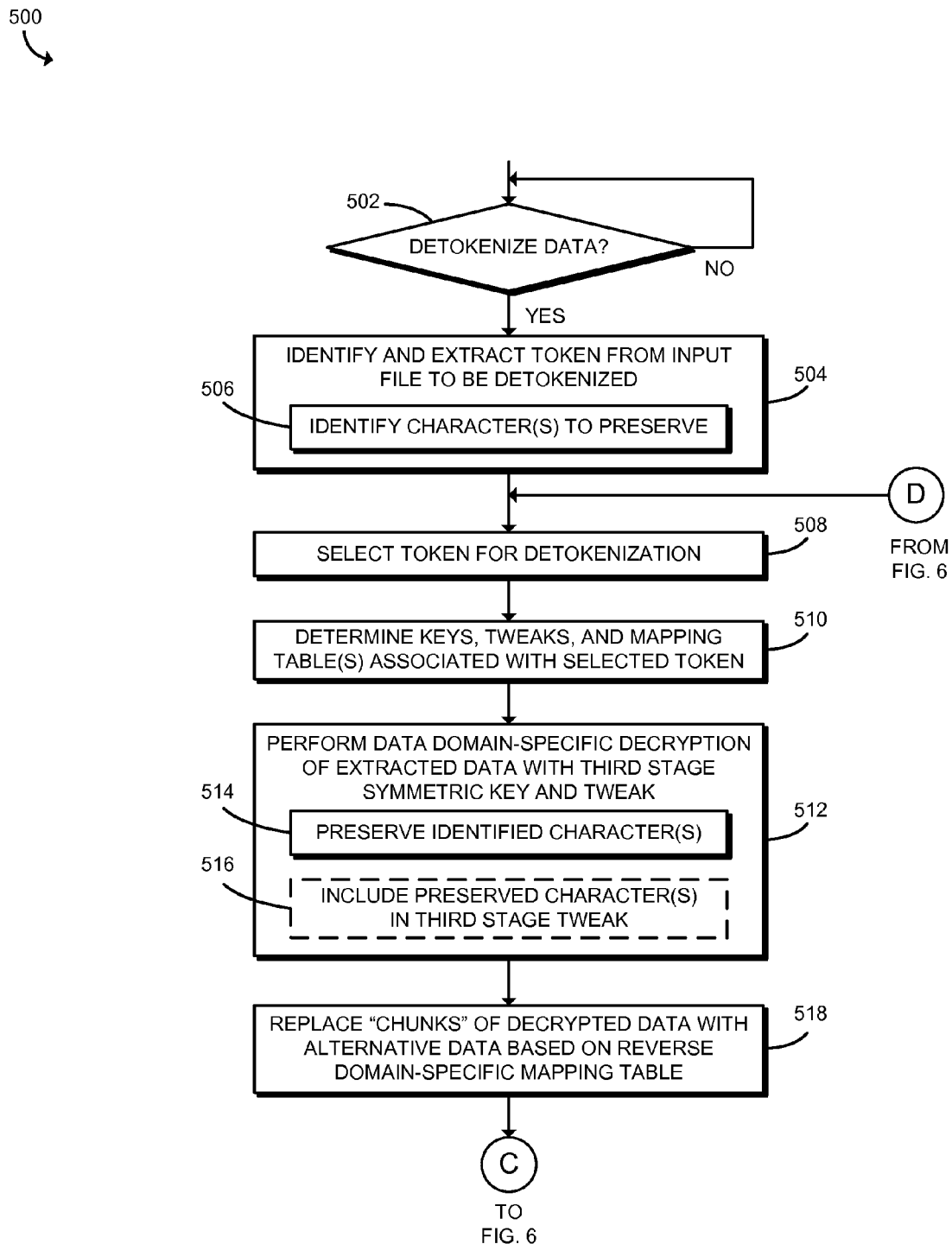
FIGS. 5-6 is a simplified flow diagram of at least one embodiment of a method for detokenizing data that may be executed by the computing device of FIG. 1.

Referring to FIG. 5, in use, the computing device 100 may execute a method 500 for detokenizing data. The illustrative method 500 begins with block 502 in which the computing device 100 determines whether to detokenize data. If so, in block 504, the computing device 100 identifies an extracts data from an input file to be detokenized (e.g., tokenized data). The computing device 100 may identify the data set for detokenization using any suitable techniques (e.g., similar to tokenization described above). In doing so, in block 506, the computing device 100 may identify one or more characters to preserve from detokenization in a manner similar to that described above with respect to tokenization. In other words, the computing device 100 may identify portion of the token (e.g., a certain number of characters) that are not to be included in the extracted data to be detokenized. Further, as described below, the preserved character(s) may be included in the processing in some embodiments.

In block 508, the computing device 100 selects an identified token (e.g., a data field, word, or otherwise identified portion of the tokenized data). As discussed below, the computing device 100 iterates through the identified tokens to generate the corresponding detokenized data (i.e., plaintext data). As such, the computing device 100 may select the token for detokenization in any suitable order. In block 510, the computing device 100 determines the cryptographic keys (e.g., first and third stage symmetric keys), cryptographic tweaks (e.g., first and second stage cryptographic tweaks), and mapping table(s) associated with the selected token (e.g., based on the determined alphabet, any known data domain-specific restrictions, and/or other suitable information).

In block 512, the computing device 100 performs data domain-specific decryption on the tokenized data with the third stage symmetric key and cryptographic tweak. For example, the computing device 100 may utilize data domain-specific FPE encryption with the pre-computed application third stage symmetric key and tweak described above. As discussed above, in some embodiments, the computing device 100 may identify one or more character(s) of the input data to preserve. As such, in block 514, the computing device 100 may preserve the identified character(s), for example, by storing those characters in the memory 114, the data storage 116, and/or the database 124. Further, in some embodiments, the computing device 100 may, in block 516, include the preserved character(s) in the third stage cryptographic tweak (e.g., by appending the preserved character(s) to the cryptographic tweak) as described above.

In block 518, the computing device 100 replaces chunks of the decrypted tokenized data with alternative data from the pre-computed static reverse mapping table. In some embodiments, the computing device 100 may utilize the same mapping tables described above with regard to tokenization but instead use the mappings in the reverse direction.

Figure 6:
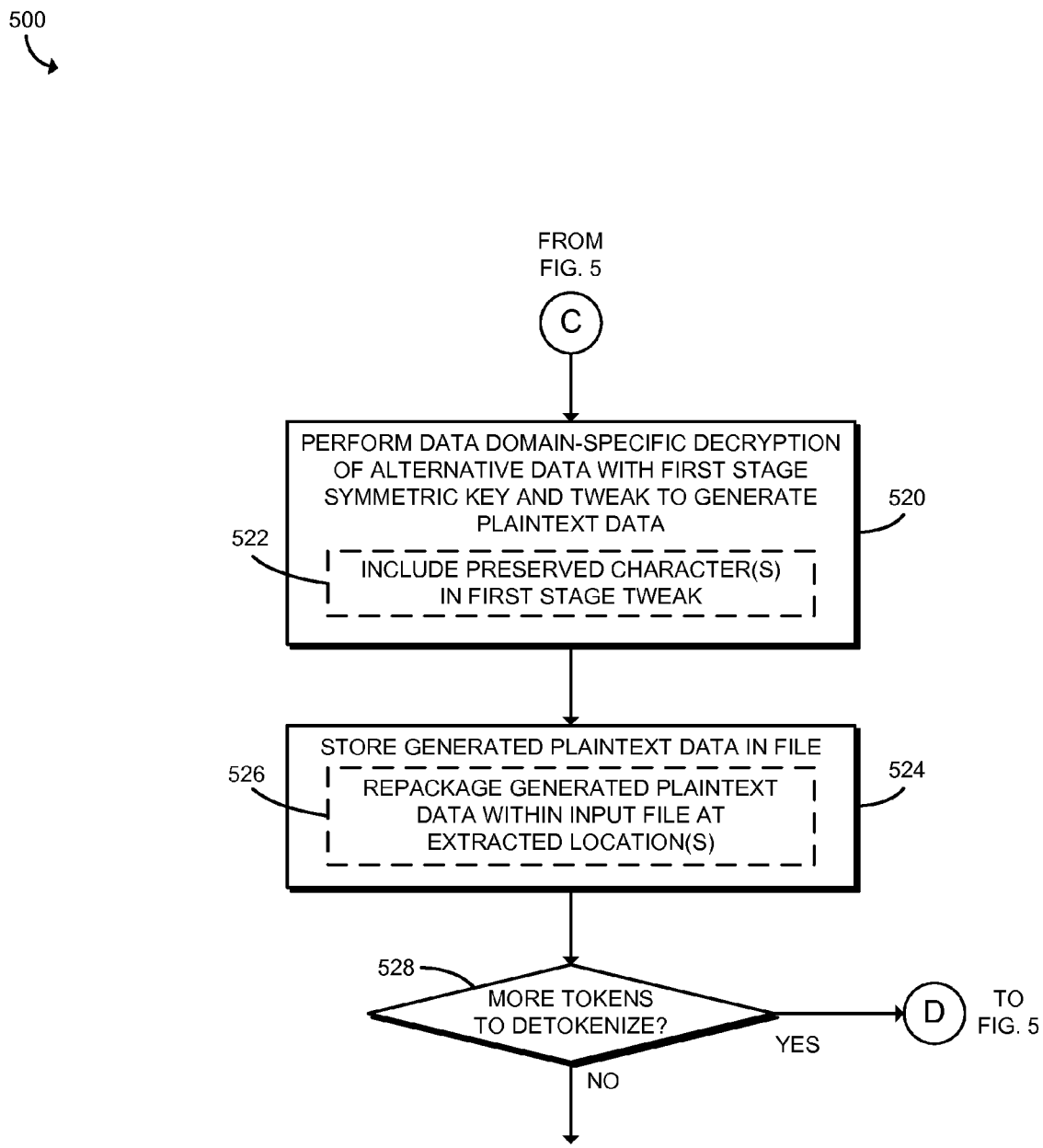

In block 520 of FIG. 6, the computing device 100 performs data domain-specific decryption of the alternative data with the first stage symmetric key and cryptographic tweak to generate the original (e.g., plaintext) data that was tokenized. In the illustrative embodiment, the computing device 100 enforces the data domain-specific restrictions and/or constraints during the transformations. Further, in some embodiments, the computing device 100 may, in block 522, include one or more preserved characters in the first stage cryptographic tweak in a manner similar to that described above.

In block 524, the computing device 100 stores the generated plaintext data in a file (e.g., in the memory 114 and/or the data storage 116). For example, in block 526, the computing device 100 may repackage the generated plaintext data within the input file (i.e., the input document or file) at the extracted location(s). In other embodiments, the computing device 100 may, alternatively or additionally, store the generated plaintext data in another location (e.g., another file). It should be appreciated that blocks 512, 518, and 520 may be referred to herein as the third stage reverse transformation, the second stage reverse transformation, and the first stage reverse transformation, respectively, for convenience.

In block 528, the computing device 100 determines whether there are more tokens to detokenize. If so, the method 500 returns to block 508 of FIG. 5 in which the computing device 100 selects the next token for detokenization. As described above, the computing device 100 may determine which token to select next in any suitable order depending on the particular embodiment.

Continuing the previously discussed example, the computing device 100 identifies the incoming 16-digit tokenized credit card number (e.g., "6745911474123456") and extracts the data to be detokenized (e.g., "67459114741"). As discussed above, the last five characters of the tokenized number (e.g., "23456") are preserved so those numbers and their positions within the incoming data/text are stored by the computing device 100. During the third stage reverse transformation, the computing device 100 performs FPE-based decryption on the extracted data: $DEC_{FPE}(key_{stage3},(tweak_{stage3}[I\ preserved]),alphabet_{decimal},"67459114741")=95846004283$. It should be appreciated that in embodiments using symmetric cryptographic keys, the encryption keys and the decryption keys are the same. During the second stage reverse transformation, the computing device 100 performs three reverse mapping table look-up replacements. For example, the computing device 100 replaces chunks "9584" with that table entry unique table value (i.e., mapped value) of "6166," replaces "6004" with the mapped value "6621," and replaces "283" with the mapped value "038." As such, the partially decrypted tokenized data (e.g., "95846004283") is replaced with the alternative data (e.g., "61666621038"). During the first stage reverse transformation, the computing device 100 performs FPE-based decryption on the extracted data or, more particularly, the alternative data: $DEC_{FPE}(key_{stage1},(tweak_{stage1}[1\ preserved]), alphabet_{decimal},"61666621038")=12345678901$. As discussed above, the computing device 100 merges the detokenized data (e.g., 12345678901") with the original preserved input (e.g., "23456") to generate the original (e.g., plaintext) data (e.g., "1234567890123456"). Further, the computing device 100 may repackage the generated original and detokenized data in the file at the appropriate location(s).

As illustrated by the example provided above, in some embodiments, the computing device 100 may utilize multiple sized pre-computed mapping tables for different types of data domain alphabets. Each mapping table may be used to map all potential input string values to another string value of the same number of characters (e.g., every output value being unique within a particular table). To compact the mapping tables, the physical input string characters may be mapped to an associated radix string alphabet. Each character in the string may be represented by a specific integer value based upon the radix and the character set representing the radix. For example, the decimal numbers may be represented by strings of the character set {'0', '1', '2', '3', '4', '5', '6', '7', '8', '9'}. Each ASCII character in the set may be mapped to specific values in the radix (e.g., '0'=0, '1'=1, '2'=2, etc.) The radix string encoding may then be converted into a big integer, which may be looked up in the associated table. Depending on the particular embodiment, the output value may be encoded, for example, as a big integer (e.g., for greatest storage compaction), as a radix string, or as the physical character string (e.g., for minimal processing).

In various embodiments, a combination of different look-ups using different mapping table sizes may be used. For example, multiple look-ups using the mapping table supporting the largest number of characters may be utilized, in some embodiments, with a final table look-up using one of the small tables for the last chunk to be processed. It should be appreciated that, in the illustrative embodiment, using the largest table introduces the largest amount of randomness to the token generation.

It should be appreciated that the mapping tables may be generated in any way (e.g., by the computing device 100 or another computing device) consistent with the performance of the functions described herein. For example, in some embodiments, the computing device 100 (or another computing device) generates a symmetric key and cryptographic key from a strong random number generator (or pseudorandom number generator). For each mapping table, the computing device 100 may iterate through all of the entries using an FPE-based algorithm to generate a pseudo-random value. The generated symmetric key and tweak may be deleted and never used again. Further, for each mapping table, the computing device 100 may iterate through the table entries generating a random entry within the table that will have generated values that will be swapped with, or randomly select two table entries and swap them.

In some embodiments, enforcing different data domain restrictions and/or constraints may require some changes to be made to the tokenization, detokenization, and/or table generation processing described above. When the underlying data domain only allows a limited subset of values, the pre-computed static mapping table(s) may require special table initialization and processing. For example, a social security number is composed of three subcomponents: a 3-digit area code, a 2-digit group, and a 4-digit serial number. Each subcomponent has a different number of digits composing it and a different range of values that are valid/invalid. As such, to handle this type of condition, the computing device 100 may generate a different mapping table for each subcomponent and ensure that valid table entries contain only valid values and that invalid table entries include only invalid values (e.g., invalid values are mapped to invalid and valid to valid). To do so, the computing device 100 may, for example, compute the table, find an invalid entry with a valid value, find a valid entry with an invalid value, and swap the content of those entries. Further, during the second stage table look-up transformation, the associated table is used in the look-up processing (e.g., the area code table for the area code subcomponent transformation, the serial number table for the serial number subcomponent transformation, etc.).

It should be appreciated that the techniques described herein provide many improvements to tokenization. For example, reversible data domain-specific FPE is used to generate a pseudorandom string to eliminate potential information leakage when utilizing pre-computed static mapping tables that are smaller than the potential number of tokens. The utilization of both reversible computability-intensive cipher algorithms (e.g., FPE) and a reversible memory-intensive algorithm (e.g., the mapping table look-up) makes the overall tokenization/detokenization system generally immune (or at least less susceptible) to any potential flaw in the cipher being utilized. Further, using FPE with one-time usage symmetric key and cryptographic tweaks to populate static mapping tables with provable pseudorandom values in a deterministic single pass, and breaking potential mathematical relationships by swapping generated values with other randomly selected entries further insulates the tokenization/detokenization system against potential weaknesses in the underlying randomness (e.g., from pseudorandom number generation). In some embodiments, the cryptographic keys, cryptographic tweaks, and the mapping tables are maintained for the life of the reversible transformation.

EXAMPLES

Illustrative examples of the technologies disclosed herein are provided below. An embodiment of the technologies may include any one or more, and any combination of, the examples described below.

Example 1 includes a computing device for tokenizing data, the computing device comprising a data extraction module to extract plaintext data from an input file to be tokenized; a cryptography module to perform data domain-specific format-preserving encryption on the extracted plaintext data based on a first cryptographic key to generate encrypted data; a data mapping module to replace one or more portions of the encrypted data with corresponding portions of alternative data based on a mapping table that maps encrypted data to alternative data; wherein the cryptography module is further to perform data domain-specific format-preserving encryption on the alternative data based on a second cryptographic key to generate a token; and a data repackaging module to store the token in an output file.

Example 2 includes the subject matter of Example 1, and wherein the data extraction module is further to extract the token from the output file to be detokenized; the cryptography module is further to perform data domain-specific format-preserving decryption on the extracted token based on the second cryptographic key to generate decrypted data; the data mapping module is further to replace one or more portions of the decrypted data with the corresponding one or more portions of the encrypted data based on the mapping table; the cryptography module is further to perform data domain-specific format-preserving decryption on the one or more portions of encrypted data based on the first cryptographic key to generate plaintext data; and the data repackaging module is further to store the plaintext data in the input file.

Example 3 includes the subject matter of any of Examples 1 and 2, and wherein to extract the plaintext data from the input file comprises to extract the plaintext data from a location in the input file; and wherein to store the plaintext data in the input file comprises to store the plaintext data at the location in the input file.

Example 4 includes the subject matter of any of Examples 1-3, and wherein to extract the plaintext data from the input file comprises to extract the plaintext data from a location in the input file; and wherein to store the token in the output file comprises to store the token at the location in the input file.

Example 5 includes the subject matter of any of Examples 1-4, and wherein to perform the encryption on the extracted plaintext data comprises to perform data domain-specific format-preserving encryption on the extracted plaintext data based on the first cryptographic key and a first cryptographic tweak.

Example 6 includes the subject matter of any of Examples 1-5, and wherein to perform the encryption on the alternative data comprises to perform data domain-specific format-preserving encryption on the alternative data based on the second cryptographic key and a second cryptographic tweak.

Example 7 includes the subject matter of any of Examples 1-6, and wherein the data extraction module is further to identify one or more characters of the plaintext data to preserve from tokenization.

Example 8 includes the subject matter of any of Examples 1-7, and wherein to perform the encryption on the extracted plaintext data comprises to perform encryption on the extracted plaintext data other than the preserved one or more characters; and wherein to perform the encryption on the alternative data comprises to perform the encryption on the alternative data other than the preserved one or more characters.

Example 9 includes the subject matter of any of Examples 1-8, and wherein to perform the encryption on the extracted plaintext data comprises to perform data domain-specific format-preserving encryption on the extracted plaintext data based on the first cryptographic key and a first cryptographic tweak, wherein the first cryptographic tweak includes the preserved one or more characters.

Example 10 includes the subject matter of any of Examples 1-9, and wherein the data extraction module is further to determine the first cryptographic key, the mapping table, and the second cryptographic key associated with the extracted plaintext data based on an alphabet of the extracted plaintext data.

Example 11 includes the subject matter of any of Examples 1-10, and wherein the one or more portions are selected based on at least one data domain-specific constraint.

Example 12 includes the subject matter of any of Examples 1-11, and wherein the one or more portions have non-uniform sizes.

Example 13 includes the subject matter of any of Examples 1-12, and wherein the alternative data is modified based on a data domain-specific constraint.

Example 14 includes the subject matter of any of Examples 1-13, and wherein the input file comprises a text file.

Example 15 includes a method for tokenizing data by a computing device, the method comprising extracting, by the computing device, plaintext data from an input file to be tokenized; performing, by the computing device, data domain-specific format-preserving encryption on the extracted plaintext data based on a first cryptographic key to generate encrypted data; replacing, by the computing device, one or more portions of the encrypted data with corresponding portions of alternative data based on a mapping table that maps encrypted data to alternative data; performing, by the computing device, data domain-specific format-preserving encryption on the alternative data based on a second cryptographic key to generate a token; and storing, by the computing device, the token in an output file.

Example 16 includes the subject matter of Example 15, and further including extracting, by the computing device, the token from the output file to be detokenized; performing, by the computing device, data domain-specific format-preserving decryption on the extracted token based on the second cryptographic key to generate decrypted data; replacing, by the computing device, one or more portions of the decrypted data with the corresponding one or more portions of the encrypted data based on the mapping table; performing, by the computing device, data domain-specific format-preserving decryption on the one or more portions of encrypted data based on the first cryptographic key to generate plaintext data; and storing, by the computing device, the plaintext data in the input file.

Example 17 includes the subject matter of any of Examples 15 and 16, and wherein extracting the plaintext data from the input file comprises extracting the plaintext data from a location in the input file; and storing the plaintext data in the input file comprises storing the plaintext data at the location in the input file.

Example 18 includes the subject matter of any of Examples 15-17, and wherein extracting the plaintext data from the input file comprises extracting the plaintext data from a location in the input file; and storing the token in the output file comprises storing the token at the location in the input file.

Example 19 includes the subject matter of any of Examples 15-18, and wherein performing the encryption on the extracted plaintext data comprises performing data domain-specific format-preserving encryption on the extracted plaintext data based on the first cryptographic key and a first cryptographic tweak.

Example 20 includes the subject matter of any of Examples 15-19, and wherein performing the encryption on the alternative data comprises performing data domain-specific format-preserving encryption on the alternative data based on the second cryptographic key and a second cryptographic tweak.

Example 21 includes the subject matter of any of Examples 15-20, and further including identifying, by the computing device, one or more characters of the plaintext data to preserve from tokenization.

Example 22 includes the subject matter of any of Examples 15-21, and wherein performing the encryption on the extracted plaintext data comprises performing encryption on the extracted plaintext data other than the preserved one or more characters; and performing the encryption on the alternative data comprises performing the encryption on the alternative data other than the preserved one or more characters.

Example 23 includes the subject matter of any of Examples 15-22, and wherein performing the encryption on the extracted plaintext data comprises performing data domain-specific format-preserving encryption on the extracted plaintext data based on the first cryptographic key and a first cryptographic tweak, wherein the first cryptographic tweak includes the preserved one or more characters.

Example 24 includes the subject matter of any of Examples 15-23, and further including determining, by the computing device, the first cryptographic key, the mapping table, and the second cryptographic key associated with the extracted plaintext data based on an alphabet of the extracted plaintext data.

Example 25 includes the subject matter of any of Examples 15-24, and further including selecting, by the computing device, the one or more portions of the encrypted data for replacement based on at least one data domain-specific constraint.

Example 26 includes the subject matter of any of Examples 15-25, and wherein replacing the one or more portions of the encrypted data comprises replacing one or more portions of the encrypted data having non-uniform sizes.

Example 27 includes the subject matter of any of Examples 15-26, and wherein the alternative data is modified based on a data domain-specific constraint.

Example 28 includes the subject matter of any of Examples 15-27, and wherein extracting the plaintext data from the input file comprises extracting the plaintext data from a text file.

Example 29 includes a computing device comprising a processor; and a memory having stored therein a plurality of instructions that when executed by the processor cause the computing device to perform the method of any of Examples 15-28.

Example 30 includes one or more machine-readable storage media comprising a plurality of instructions stored thereon that, in response to execution by a computing device, cause the computing device to perform the method of any of Examples 15-28.

Example 31 includes a computing device for tokenizing data, the computing device comprising means for extracting plaintext data from an input file to be tokenized; means for performing data domain-specific format-preserving encryption on the extracted plaintext data based on a first cryptographic key to generate encrypted data; means for replacing one or more portions of the encrypted data with corresponding portions of alternative data based on a mapping table that maps encrypted data to alternative data; means for performing data domain-specific format-preserving encryption on the alternative data based on a second cryptographic key to generate a token; and means for storing the token in an output file.

Example 32 includes the subject matter of Example 31, and further including means for extracting the token from the output file to be detokenized; means for performing data domain-specific format-preserving decryption on the extracted token based on the second cryptographic key to generate decrypted data; means for replacing one or more portions of the decrypted data with the corresponding one or more portions of the encrypted data based on the mapping table; means for performing data domain-specific format-preserving decryption on the one or more portions of encrypted data based on the first cryptographic key to generate plaintext data; and means for storing the plaintext data in the input file.

Example 33 includes the subject matter of any of Examples 31 and 32, and wherein the means for extracting the plaintext data from the input file comprises means for extracting the plaintext data from a location in the input file; and the means for storing the plaintext data in the input file comprises means for storing the plaintext data at the location in the input file.

Example 34 includes the subject matter of any of Examples 31-33, and wherein the means for extracting the plaintext data from the input file comprises means for extracting the plaintext data from a location in the input file; and the means for storing the token in the output file comprises means for storing the token at the location in the input file.

Example 35 includes the subject matter of any of Examples 31-34, and wherein the means for performing the encryption on the extracted plaintext data comprises means for performing data domain-specific format-preserving encryption on the extracted plaintext data based on the first cryptographic key and a first cryptographic tweak.

Example 36 includes the subject matter of any of Examples 31-35, and wherein the means for performing the encryption on the alternative data comprises means for performing data domain-specific format-preserving encryption on the alternative data based on the second cryptographic key and a second cryptographic tweak.

Example 37 includes the subject matter of any of Examples 31-36, and further including means for identifying one or more characters of the plaintext data to preserve from tokenization.

Example 38 includes the subject matter of any of Examples 31-37, and wherein the means for performing the encryption on the extracted plaintext data comprises means for performing encryption on the extracted plaintext data other than the preserved one or more characters; and the means for performing the encryption on the alternative data comprises means for performing the encryption on the alternative data other than the preserved one or more characters.

Example 39 includes the subject matter of any of Examples 31-38, and wherein the means for performing the encryption on the extracted plaintext data comprises means for performing data domain-specific format-preserving encryption on the extracted plaintext data based on the first cryptographic key and a first cryptographic tweak, wherein the first cryptographic tweak includes the preserved one or more characters.

Example 40 includes the subject matter of any of Examples 31-39, and further including means for determining the first cryptographic key, the mapping table, and the second cryptographic key associated with the extracted plaintext data based on an alphabet of the extracted plaintext data.

Example 41 includes the subject matter of any of Examples 31-40, and further including means for selecting the one or more portions of the encrypted data for replacement based on at least one data domain-specific constraint.

Example 42 includes the subject matter of any of Examples 31-41, and wherein the means for replacing the one or more portions of the encrypted data comprises means for replacing one or more portions of the encrypted data having non-uniform sizes.

Example 43 includes the subject matter of any of Examples 31-42, and wherein the alternative data is modified based on a data domain-specific constraint.

Example 44 includes the subject matter of any of Examples 31-43, and wherein the means for extracting the plaintext data from the input file comprises means for extracting the plaintext data from a text file.

Example 45 includes a computing device for detokenizing data, the computing device comprising a data extraction module to extract a token from an input file to be detokenized; a cryptography module to perform data domain-specific format-preserving decryption on the extracted token based on a first cryptographic key to generate decrypted data; a data mapping module to replace one or more portions of the decrypted data with corresponding portions of alternative data based on a mapping table that maps decrypted data to alternative data; wherein the cryptography module is further to perform data domain-specific format-preserving decryption on the alternative data based on a second cryptographic key to generate plaintext data; and a data repackaging module to store the plaintext data in an output file.

Example 46 includes the subject matter of Example 45, and wherein to extract the token from the input file comprises to extract the token from a location in the input file; and wherein to store the plaintext data in the output file comprises to store the plaintext data at the location in the input file.

Example 47 includes the subject matter of any of Examples 45 and 46, and wherein the extracted token comprises a token generated as a function of (i) the second cryptographic key applied to the plaintext data to generate encrypted data, (ii) a reverse mapping of the mapping table applied to the encrypted data to generate a second alternative data, and (iii) the first cryptographic key applied to the second alternative data.

Example 48 includes the subject matter of any of Examples 45-47, and wherein to perform the decryption on the extracted token comprises to perform data domain-specific format-preserving decryption on the extracted token based on the first cryptographic key and a first cryptographic tweak.

Example 49 includes the subject matter of any of Examples 45-48, and wherein to perform the decryption on the alternative data comprises to perform data domain-specific format-preserving decryption on the alternative data based on the second cryptographic key and a second cryptographic tweak.

Example 50 includes the subject matter of any of Examples 45-49, and wherein the data extraction module is further to identify one or more characters of the token to preserve from detokenization.

Example 51 includes the subject matter of any of Examples 45-50, and wherein to perform the decryption on the extracted token comprises to perform decryption on the extracted token other than the preserved one or more characters; and wherein to perform the decryption on the alternative data comprises to perform the decryption on the alternative data other than the preserved one or more characters.

Example 52 includes the subject matter of any of Examples 45-51, and wherein the data extraction module is further to determine the first cryptographic key, the mapping table, and the second cryptographic key associated with the extracted token based on an alphabet of the extracted token.

Example 53 includes the subject matter of any of Examples 45-52, and wherein the one or more portions are selected based on at least one data domain-specific constraint.

Example 54 includes the subject matter of any of Examples 45-53, and wherein the one or more portions have non-uniform sizes.

Example 55 includes the subject matter of any of Examples 45-54, and wherein the input file comprises a text file.

Example 56 includes a method for detokenizing data by a computing device, the method comprising extracting, by the computing device, a token from an input file to be detokenized; performing, by the computing device, data domain-specific format-preserving decryption on the extracted token based on a first cryptographic key to generate decrypted data; replacing, by the computing device, one or more portions of the decrypted data with corresponding portions of alternative data based on a mapping table that maps decrypted data to alternative data; performing, by the computing device, data domain-specific format-preserving decryption on the alternative data based on a second cryptographic key to generate plaintext data; and storing, by the computing device, the plaintext data in an output file.

Example 57 includes the subject matter of Example 56, and wherein extracting the token from the input file comprises extracting the token from a location in the input file; and storing the plaintext data in the output file comprises storing the plaintext data at the location in the input file.

Example 58 includes the subject matter of any of Examples 56 and 57, and wherein performing the decryption on the extracted token comprises performing data domain-specific format-preserving decryption on the extracted token based on the first cryptographic key and a first cryptographic tweak.

Example 59 includes the subject matter of any of Examples 56-58, and wherein performing the decryption on the alternative data comprises performing data domain-specific format-preserving decryption on the alternative data based on the second cryptographic key and a second cryptographic tweak.

Example 60 includes the subject matter of any of Examples 56-59, and further including identifying, by the computing device, one or more characters of the token to preserve from detokenization.

Example 61 includes the subject matter of any of Examples 56-60, and wherein performing the decryption on the extracted token comprises performing decryption on the extracted token other than the preserved one or more characters; and wherein performing the decryption on the alternative data comprises performing the decryption on the alternative data other than the preserved one or more characters.

Example 62 includes the subject matter of any of Examples 56-61, and further including determining, by the computing device, the first cryptographic key, the mapping table, and the second cryptographic key associated with the extracted token based on an alphabet of the extracted token.

Example 63 includes the subject matter of any of Examples 56-62, and further including selecting, by the computing device, the one or more portions of the decrypted data for replacement based on at least one data domain-specific constraint.

Example 64 includes the subject matter of any of Examples 56-63, and wherein replacing the one or more portions of the decrypted data comprises replacing one or more portions of the decrypted data having non-uniform sizes.

Example 65 includes the subject matter of any of Examples 56-64, and wherein extracting the token from the input file comprises extracting the token from a text file.

Example 66 includes a computing device comprising a processor; and a memory having stored therein a plurality of instructions that when executed by the processor cause the computing device to perform the method of any of Examples 56-65.

Example 67 includes one or more machine-readable storage media comprising a plurality of instructions stored thereon that, in response to execution by a computing device, cause the computing device to perform the method of any of Examples 56-65.

Example 68 includes a computing device for detokenizing data, the computing device comprising means for extracting a token from an input file to be detokenized; means for performing data domain-specific format-preserving decryption on the extracted token based on a first cryptographic key to generate decrypted data; means for replacing one or more portions of the decrypted data with corresponding portions of alternative data based on a mapping table that maps decrypted data to alternative data; means for performing data domain-specific format-preserving decryption on the alternative data based on a second cryptographic key to generate plaintext data; and storing the plaintext data in an output file.

Example 69 includes the subject matter of Example 68, and wherein the means for extracting the token from the input file comprises means for extracting the token from a location in the input file; and means for storing the plaintext data in the output file comprises storing the plaintext data at the location in the input file.

Example 70 includes the subject matter of any of Examples 68 and 69, and wherein the means for performing the decryption on the extracted token comprises means for performing data domain-specific format-preserving decryption on the extracted token based on the first cryptographic key and a first cryptographic tweak.

Example 71 includes the subject matter of any of Examples 68-70, and wherein the means for performing the decryption on the alternative data comprises means for performing data domain-specific format-preserving decryption on the alternative data based on the second cryptographic key and a second cryptographic tweak.

Example 72 includes the subject matter of any of Examples 68-71, and further comprising means for identifying one or more characters of the token to preserve from detokenization.

Example 73 includes the subject matter of any of Examples 68-72, and wherein the means for performing the decryption on the extracted token comprises means for performing decryption on the extracted token other than the preserved one or more characters; and wherein the means for performing the decryption on the alternative data comprises means for performing the decryption on the alternative data other than the preserved one or more characters.

Example 74 includes the subject matter of any of Examples 68-73, and further including means for determining the first cryptographic key, the mapping table, and the second cryptographic key associated with the extracted token based on an alphabet of the extracted token.

Example 75 includes the subject matter of any of Examples 68-74, and further including means for selecting the one or more portions of the decrypted data for replacement based on at least one data domain-specific constraint.

Example 76 includes the subject matter of any of Examples 68-75, and wherein the means for replacing the one or more portions of the decrypted data comprises means for replacing one or more portions of the decrypted data having non-uniform sizes.

Example 77 includes the subject matter of any of Examples 68-76, and wherein the means for extracting the token from the input file comprises means for extracting the token from a text file.

The invention claimed is:

1. One or more machine-readable storage media comprising a plurality of instructions stored thereon that, when executed by a computing device, cause the computing device to:
   extract a token from an input file to be detokenized;
   perform data domain-specific format-preserving decryption on the extracted token based on a first cryptographic key to generate decrypted data;
   replace one or more portions of the decrypted data with corresponding portions of alternative data based on a mapping table that maps decrypted data to alternative data;
   perform data domain-specific format-preserving decryption on the alternative data based on a second cryptographic key to generate plaintext data; and
   store, by the computing device, the plaintext data in an output file.

2. The one or more machine-readable storage media of claim 1, wherein to extract the token from the input file comprises to:
   extract the token from a location in the input file; and
   store the plaintext data in the output file comprises storing the plaintext data at the location in the input file.

3. The one or more machine-readable storage media of claim 1, wherein the extracted token comprises a token generated as a function of (i) the second cryptographic key applied to the plaintext data to generate encrypted data, (ii) a reverse mapping of the mapping table applied to the encrypted data to generate a second alternative data, and (iii) the first cryptographic key applied to the second alternative data.

4. The one or more machine-readable storage media of claim 1, wherein the plurality of instructions, when executed, further cause the computing device to determine the first cryptographic key, the mapping table, and the second cryptographic key associated with the extracted token based on an alphabet of the extracted token.

5. The one or more machine-readable storage media of claim 1, wherein the plurality of instructions, when executed, further cause the computing device to select the one or more portions of the decrypted data for replacement based on at least one data domain-specific constraint.

6. The one or more machine-readable storage media of claim 1, wherein to replace the one or more portions of the decrypted data comprises to replace one or more portions of the decrypted data having non-uniform sizes.

7. The one or more machine-readable storage media of claim 1, wherein to extract the token from the input file comprises to extract the token from a text file.

8. The one or more machine-readable storage media of claim 1, wherein to perform the decryption on the extracted token comprises to perform data domain-specific format-preserving decryption on the extracted token based on the first cryptographic key and a first cryptographic tweak.

9. The one or more machine-readable storage media of claim 8, wherein to perform the decryption on the alternative data comprises to perform data domain-specific format-preserving decryption on the alternative data based on the second cryptographic key and a second cryptographic tweak.

10. The one or more machine-readable storage media of claim 1, wherein the plurality of instructions, when executed, further cause the computing device to identify one or more characters of the token to preserve from detokenization.

11. The one or more machine-readable storage media of claim 10, wherein to perform the decryption on the extracted token comprises to perform decryption on the extracted token other than the preserved one or more characters; and
wherein to perform the decryption on the alternative data comprises to perform the decryption on the alternative data other than the preserved one or more characters.

12. A method for detokenizing data by a computing device, the method comprising:
extracting, by the computing device, a token from an input file to be detokenized;
performing, by the computing device, data domain-specific format-preserving decryption on the extracted token based on a first cryptographic key to generate decrypted data;
replacing, by the computing device, one or more portions of the decrypted data with corresponding portions of alternative data based on a mapping table that maps decrypted data to alternative data;
performing, by the computing device, data domain-specific format-preserving decryption on the alternative data based on a second cryptographic key to generate plaintext data; and
storing, by the computing device, the plaintext data in an output file.

13. The method of claim 12, wherein extracting the token from the input file comprises:
extracting the token from a location in the input file; and
storing the plaintext data in the output file comprises storing the plaintext data at the location in the input file.

14. The method of claim 12, wherein the extracted token comprises a token generated as a function of (i) the second cryptographic key applied to the plaintext data to generate encrypted data, (ii) a reverse mapping of the mapping table applied to the encrypted data to generate a second alternative data, and (iii) the first cryptographic key applied to the second alternative data.

15. The method of claim 12, further comprising determining, by the computing device, the first cryptographic key, the mapping table, and the second cryptographic key associated with the extracted token based on an alphabet of the extracted token.

16. The method of claim 12, further comprising selecting, by the computing device, the one or more portions of the decrypted data for replacement based on at least one data domain-specific constraint.

17. The method of claim 12, wherein replacing the one or more portions of the decrypted data comprises replacing one or more portions of the decrypted data having non-uniform sizes.

18. The method of claim 12, wherein extracting the token from the input file comprises extracting the token from a text file.

19. The method of claim 12, wherein performing the decryption on the extracted token comprises performing data domain-specific format-preserving decryption on the extracted token based on the first cryptographic key and a first cryptographic tweak.

20. The method of claim 19, wherein performing the decryption on the alternative data comprises performing data domain-specific format-preserving decryption on the alternative data based on the second cryptographic key and a second cryptographic tweak.

21. The method of claim 12, further comprising identifying, by the computing device, one or more characters of the token to preserve from detokenization.

22. The method of claim 21, wherein performing the decryption on the extracted token comprises performing decryption on the extracted token other than the preserved one or more characters; and
wherein performing the decryption on the alternative data comprises performing the decryption on the alternative data other than the preserved one or more characters.

23. One or more machine-readable storage media comprising a plurality of instructions stored thereon that, when executed by a computing device, cause the computing device to:
perform data domain-specific format-preserving encryption on plaintext data based on a first cryptographic key to generate encrypted data;
replace one or more portions of the encrypted data with corresponding portions of first alternative data based on a first mapping table;
perform data domain-specific format-preserving encryption on the alternative data based on a second cryptographic key to generate a token;
perform data domain-specific format-preserving decryption on the token based on the second cryptographic key to generate decrypted data;
replace one or more portions of the decrypted data with corresponding portions of second alternative data based on a second mapping table;
perform data domain-specific format-preserving decryption on the alternative data based on the first cryptographic key to generate the plaintext data.

24. The one or more machine-readable storage media of claim 23, wherein the first mapping table and the second mapping table comprise a single mapping table.

25. The one or more machine-readable storage media of claim 23, wherein the plurality of instructions, when executed, further cause the computing device to:
extract the plaintext data from a location in the input file to be tokenized prior to the performance of the data domain-specific format-preserving encryption on the plaintext data;
store the generated token at the location in the input file;
extract the generated token from the location in the input file prior to the performance of the data domain-specific format-preserving decryption on the token; and
store the generated plaintext data at the location in the input file.

* * * * *